Figure 3:
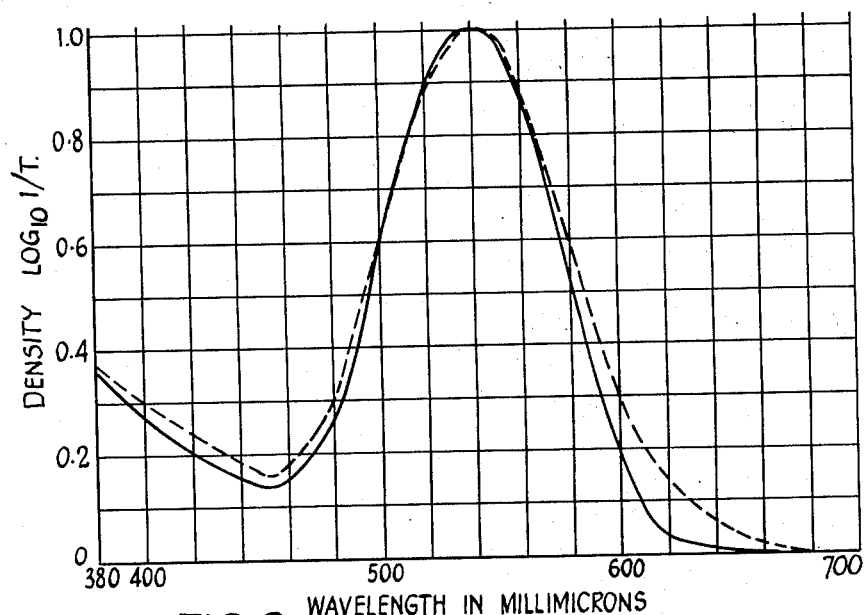

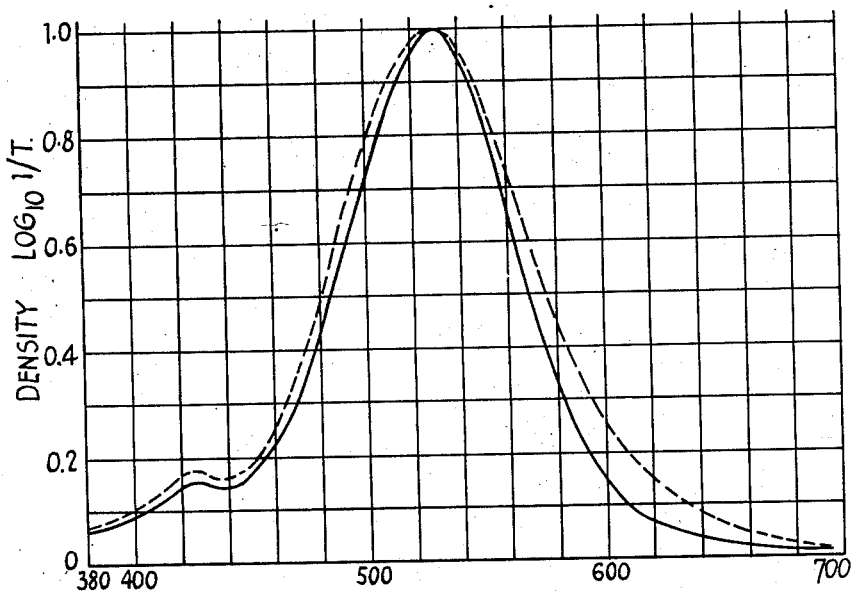
FIG.I. WAVELENGTH IN MILLIMICRONS.
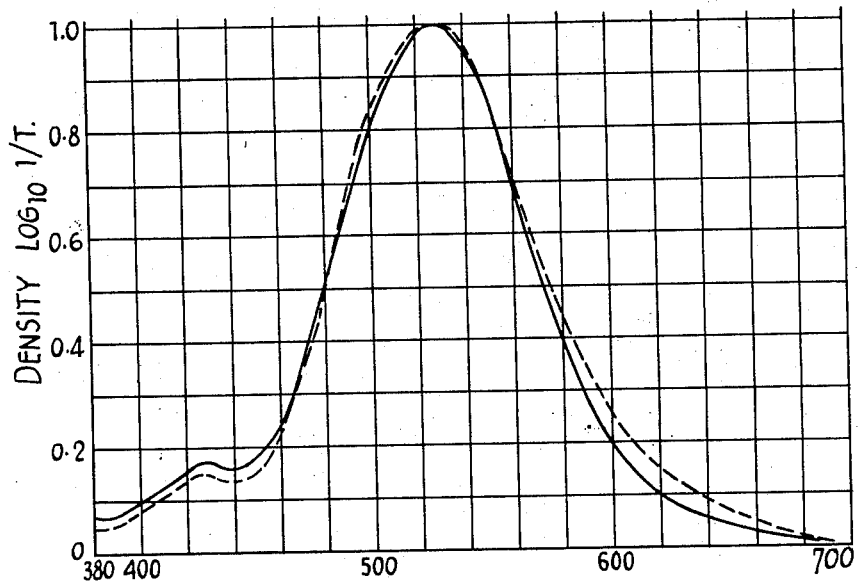
FIG.2. WAVELENGTH IN MILLIMICRONS

United States Patent Office 3,127,269
Patented Mar. 31, 1964

3,127,269
COLOUR PHOTOGRAPHY
Colin William Greenhalgh, Walkden, Manchester, and Kenneth Charles Stone, Heywood, England, assignors to Ilford Limited, Ilford, England, a British company
Filed Sept. 4, 1962, Ser. No. 221,278
Claims priority, application Great Britain Sept. 11, 1961
6 Claims. (Cl. 96—55)

This invention relates to colour photography and more particularly to the provision of a new class of colour couplers for use in colour photography.

Most modern processes of colour photography are based on the formation of colour images by the development of a developable silver salt image by means of an aromatic primary amino developing agent, of which the N,N-di-substituted p-phenylene diamines and their homologues are usually employed, in the presence of a substance, known as a colour coupler, which will combine with the oxidation products of such a developer, formed in the development, to generate in situ with the developed silver image an image in azomethine or indophenol dye. Very large numbers of such colour couplers have been described in the literature, though few are of real value in colour photography since to be useful on a practical basis a colour coupler must not only generate a dye of appropriate hue, usually a subtractive colour of as pure a hue as possible, but must be readily put to use and rapid in action.

It is an object of the present invention to provide new colour couplers yielding magenta dye images which are of improved characteristics relative to couplers of closely similar structure previously described in the literature.

According to a first feature of the present invention there is provided a new class of colour couplers which are compounds of the general formula:

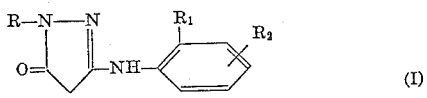

(I)

wherein R is an aryl or substituted aryl group, $R_1$ is a substituent selected from halogen atoms and alkyl, alkoxy, nitro and acylamino groups, and $R_2$ is hydrogen, halogen, alkyl, alkoxy, nitro or acylamino.

It is a critical feature of these colour couplers that they contain a substituent $R_1$ which is ortho to the amino group. As compared with colour couplers of similar constitution but in which there is a substituent in the meta or para position and no substituent in the ortho position, the colour couplers of the present invention yield magenta dyes having improved absorption characteristics, in particular a steep flank to the longer wavelengths in the absorption spectra. This may be demonstrated by comparing compounds of general Formula I in which R represents a phenyl group or 2,4,6-trichlorophenyl group, and there is one substituent only in the benzene ring (shown as containing $R_1$ and $R_2$) which is chlorine, methyl, methoxy or nitro and is present in ortho, meta or para positions to the imino linkage. For comparision these compounds were coupled with 2-methyl-4-diethylaminoaniline and the resulting dyes dissolved in a mixture of ethylene glycol monomethyl ether (80%) and water (20%). Spectrometer curves were obtained and were adjusted to a maximum density of 1.0. The steepness of the long wavelength flank of the curves was expressed numerically by reading the wavelength at density 0.1 and substracting from this figure the wavelength at density 0.5. The values, $\lambda_R$, obtained are given in the following table:

| R | Substituent | $\lambda_R$ | | |
|---|---|---|---|---|
| | | Ortho- | Para- | Meta- |
| Phenyl | Chloro | 51 | 67 | 66 |
| Phenyl | Methyl | 49 | 62 | 63 |
| Phenyl | Methoxy | 57 | 85 | |
| Phenyl | Nitro | 46 | 56 | 62 |
| 2,4,6-trichlorphenyl | Nitro | 40 | 57 | |
| 2,4,6-trichlorphenyl | $-NHCOCH_2CH\begin{smallmatrix}COOH\\N-\langle\rangle-C_{12}H_{25}\\COCH_3\end{smallmatrix}$ | 46 | 59 | |
| Phenyl | $-NHCOCH_2CH\begin{smallmatrix}COOH\\N-\langle\rangle-C_{12}H_{25}\\COCH_3\end{smallmatrix}$ | 55 | 75 | 65 |
| Phenyl | None | | | 62 |
| 2,4,6-trichlorphenyl | None | | | 58 |

The comparison is further shown by the accompanying drawings which refer to examples appearing later herein. In FIGURE 1 the full line is the absorption curve of the dye obtained by colour development of a gelatino silver halide emulsion layer containing the coupler of Example 27 (which follows) and the broken line curve is that of the dye similarly obtained from the corresponding para substituted coupler. It is seen that the dyestuff obtained from the coupler of Example 27 has the steeper flank to longer wavelength. FIGURE 2 compares the dye obtained from the same para substituted coupler (broken line curve) with that from Example 28 which has an ortho chloro substituent (full line curve). It is again seen that the ortho substituted coupler has the steeper flank to longer wavelengths.

FIGURE 3 compares the dye image obtained in an emulsion layer using a developer solution containing the coupler 1-(2,4,6-trichlorphenyl)-3(4-nitroanilino)-5-pyrazolone, which is described in British patent specification No. 886,723, the developing agent 4-N-ethyl-N-β-methanesulphonylethylamino-2-methyl-aniline (broken line curve), with the dye image obtained when the coupler is replaced by the corresponding coupler containing an ortho chloro substituent in the anilino ring and which is the coupler of Example 20 (full line curve). It is seen that the coupler of Example 20 gives a dye with a steeper flank to longer wavelength.

The colour couplers of the invention may be readily prepared by reacting together a compound of the general Formula II:

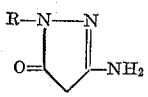

i.e. a 1-aryl (or substituted aryl)-3-amino pyrazolone, with an arylamine of the general Formula III:

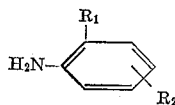

where $R_1$ and $R_2$ have the meanings assigned to them above, in the presence of an acid condensing agent, preferably acetic acid.

Alternatively, where the group $R_1$ is an electronegative substituent the colour couplers may be prepared by subjecting to treatment with aqueous alkali (e.g., caustic soda or caustic potash) a compound of the general Formula IV:

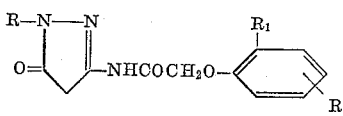

According to a further feature of the present invention there is provided a process for the production of a magenta colour image as a step in a process of colour photography which comprises developing a reducible silver salt image in a photographic emulsion layer by means of an N,N-di-substituted p-phenylene diamine or homologue thereof in the presence of a colour coupler of general Formula I set forth above.

The colour couplers may be included in the developing solution where they are sufficiently soluble for the purpose, or may be included in the photographic emulsion layer or in a layer adjacent thereto in the photographic material.

The following are examples illustrating colour couplers according to the invention and their production:

EXAMPLE 1

1-Phenyl-3-(2-Methylanilino)-5-Pyrazolone

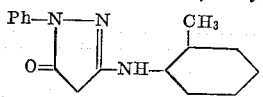

A mixture of 17.5 parts of 1-phenyl-3-amino-5-pyrazolone, 10.7 parts of o-toluidine and 75 parts of acetic acid is heated under reflux for 4 hours. After cooling, the crystalline product is filtered off and recrystallised from acetic acid. The colour coupler is obtained as colourless crystals melting at 162° C. and on analysis is found to contain 72.7% of carbon, 5.5% of hydrogen and 15.7% of nitrogen ($C_{16}H_{15}ON_3$ requires 72.5% of carbon, 5.7% of hydrogen and 15.8% of nitrogen).

The dyestuff obtained on colour development of the coupler with 2-methyl-4-diethylaminoaniline is dissolved in a mixture of ethylene glycol monomethyl ether (80%) and water (20%) and a spectrometer curve determined and the maximum density adjusted to a density of 1.0. The steepness of the flank to longer wavelengths, $\lambda_R$, can then be expressed numerically by reading the wavelength at density 0.1 and subtracting from this figure the wavelength at density 0.5. The value obtained for $\lambda_R$ is 49.

In all the examples which follow $\lambda_R$ values given were determined as just set forth.

EXAMPLE 2

1-Phenyl-3-(2-Methoxyanilino)-5-Pyrazolone

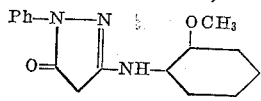

A mixture of 17.5 parts of 1-phenyl-3-amino-5-pyrazolone, 12.3 parts of o-anisidine and 75 parts of acetic acid is heated under reflux for 4 hours. The reaction mixture is cooled, poured into dilute hydrochloric acid and the precipitated product filtered off, washed with water and dried. Recrystallisation from β-ethoxyethanol gives the colour coupler as colourless crystals melting at 180° C. On analysis the colour coupler is found to contain 68.2% of carbon and 5.5% of hydrogen ($C_{16}H_{15}O_2N_3$ requires 68.5% of carbon and 5.4% of hydrogen). $\lambda_R=57$.

EXAMPLE 3

1-Phenyl-3-(2:5-Dimethoxyanilino)-5-Pyrazolone

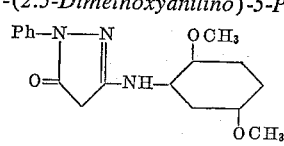

In place of the 12.3 parts of o-anisidine used in Example 2 there are used 12.7 parts of 2:5-dimethoxyaniline. The colour coupler is recrystallised from methanol when it is obtained as colourless crystals melting at 160° C. On analysis the colour coupler is found to contain 64.5% of carbon, 5.1% of hydrogen and 13.5% of nitrogen ($C_{17}H_{17}O_3N_3$ requires 65.5% of carbon, 5.5% of hydrogen and 13.5% of nitrogen). $\lambda_R=57$.

EXAMPLE 4

1-Phenyl-3-(2-Chloroanilino)-5-Pyrazolone

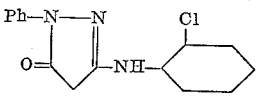

In place of the 12.3 parts of o-anisidine used in Example 2 there are used 12.7 parts of o-chloroaniline. The colour coupler after crystallisation from iso-propanol melts at 210° C. and on analysis is found to contain 63.4% of carbon and 4.3% of hydrogen ($C_{15}H_{12}ON_3Cl$ requires 63.0% of carbon and 4.2% of hydrogen). $\lambda_R=51$.

EXAMPLE 4

1-Phenyl-3-(2-Methyl-5-Acetylaminoanilino)-5-Pyrazolone

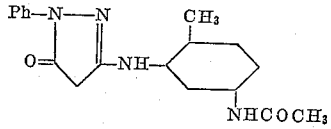

A mixture of 17.5 parts of 1-phenyl-3-anilino-5-pyrazolone, 16.4 parts of 2-methyl-5-acetylaminoaniline and 75 parts of acetic acid is heated under reflux for 7 hours. After cooling to room temperature the crystalline product is filtered off and recrystallised from n-propanol when it is obtained as colourless crystals melting at 226–228° C. On analysis the colour coupler is found to contain 66.9% of carbon, 5.4% of hydrogen and 16.6% of nitrogen ($C_{18}H_{18}O_2N_4$ requires 67.1% of carbon, 5.6% of hydrogen and 17.4% of nitrogen). $\lambda_R=54$.

EXAMPLE 6

1-Phenyl-3-(2-Methoxy-5-Nitroanilino)-5-Pyrazolone

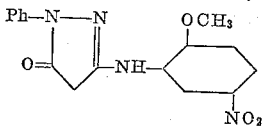

A mixture of 17.5 parts of 1-phenyl-3-amino-5-pyrazolone, 17 parts of 2-methoxy-5-nitroaniline and 100 parts of acetic acid is heated under reflux for 18 hours. After cooling the crystalline product is filtered off, washed with methanol and dried. The colour coupler is obtained as yellow crystals melting at 250–255° C. and on analysis is found to contain 58.9% of carbon, 4.5% of hydrogen and 16.8% of nitrogen ($C_{16}H_{14}O_4N_4$ requires 58.9% of carbon, 4.3% of hydrogen and 17.2% of nitrogen). $\lambda_R=51$.

EXAMPLE 7

*1-Phenyl-3-(2-nitroanilino)-5-Pyrazolone*

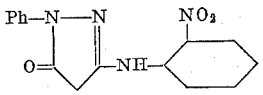

A solution of 14 parts of 1-phenyl-3-(2-nitrophenoxyacetyl amino)-5-pyrazolone in 60 parts of ethanol and 16 parts of water containing 3.2 parts of sodium hydroxide is stirred at 20° C. for 4 hours. The brown solution obtained is diluted with an equal volume of water, acidified with acetic acid and the precipitated product filtered off and washed with methanol. The colour coupler is purified by dissolving in dimethyl formamide and adding methanol until crystallisation begins. 1-phenyl-3-(2-nitroanilino)-5-pyrazolone is thus obtained as red needle crystals melting at 226° C. and on analysis is found to contain 60.7% of carbon, 4.0% of hydrogen and 18.6% of nitrogen ($C_{15}H_{12}O_3N_4$ requires 61% of carbon, 4.05% of hydrogen and 18.9% of nitrogen). $\lambda_R=46$.

The 1-phenyl-3-(2-nitrophenoxyacetylamino)-5-pyrazolone used in the above example may be obtained as follows:

17.5 parts of 1-phenyl-3-amino-5-pyrazolone is added to a solution of 22 parts of 2-nitrophenoxyacetyl chloride in 100 parts of dioxan and the solution obtained heated under reflux for 3½ hours. The reaction mixture is poured into 500 parts of water and the precipitated product filtered off, washed with water, dried and recrystallised from dioxan to give the intermediate as off-white crystals melting at 193° C.

EXAMPLE 8

*1-(2:4:6-Trichlorophenyl)-3-(2-Nitroanilino)-5-Pyrazolone*

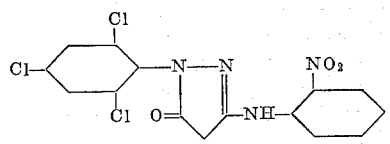

17 parts of 1-(2:4:6-trichlorophenyl)-3-(2-nitrophenoxyacetyl amino)-5-pyrazolone is added to a solution of 3 parts of sodium hydroxide in 28 parts of ethanol and 7.5 parts of water and the solution obtained stirred at 20° C. for 18 hours. After dilution with water the reaction mixture is acidified with acetic acid and the precipitated coupler is filtered off and washed with water. The colour coupler is dissolved in 50 parts of dimethyl formamide and poured into dilute brine and the precipitated coupler filtered off, washed with water, and dried when the coupler is obtained as a brown solid melting at 116–120° C., and on analysis is found to contain 45% of carbon, 2.3% of hydrogen, 13.9% of nitrogen and 26.4% of chlorine ($C_{15}H_9O_3N_4Cl_3$ requires 45% of carbon, 2.9% of hydrogen, 14% of nitrogen and 26.6% of chlorine). $\lambda_R=40$.

The 1-(2:4:6-trichlorophenyl)-3-(2-nitrophenoxyacetylamino)-5-pyrazolone used in the above example may be prepared in the following manner:

A solution of 11.8 parts of 2-nitrophenoxyacetyl chloride in 25 parts of acetonitrile is added to a solution of 13.9 parts of 1-(2:4:6-trichlorophenyl)-3-amino-5-pyrazolone in 50 parts of acetonitrile and the mixture heated under reflux for 4 hours. After cooling the crystalline precipitate is filtered off, washed with acetonitrile and dried to give the intermediate as an off-white solid melting at 176° C.

EXAMPLE 9

*1-Phenyl-3-(2:4-Dimethylanilino)-5-Pyrazolone*

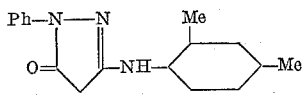

A mixture of 17.5 parts of 1-phenyl-3-amino-5-pyrazolone, 12.1 parts of 2:4-dimethylaniline and 50 parts of acetic acid is heated under reflux for 6 hours. The reaction mixture is poured into dilute hydrochloric acid and the precipitated gum washed by decantation with water and then slurried with methanol when it solidifies. The coupler is recrystallized from methanol to give colourless crystals melting at 136° C. On analysis the coupler is found to contain 69.5% of carbon and 6.3% of hydrogen ($C_{17}H_{16}ON_3$ requires 73.0% of carbon and 6.1% of hydrogen). $\lambda_R=56$.

EXAMPLE 10

*1-Phenyl-3-(2-Methyl-4-Chloroanilino)-5-pyrazolone*

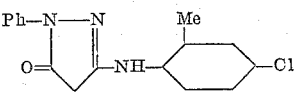

In place of the 12.1 parts of 2:4-dimethylaniline used in Example 9 there are used 14.1 parts of 2-methyl-4-chloroaniline. The colour coupler is recrystallised from n-propanol and is obtained as colourless crystals with melting point 186° C. On analysis the coupler is found to contain 64.4% of carbon, 5.1% of hydrogen, 13.3% of nitrogen and 11.7% of chlorine ($C_{16}H_{14}ON_3Cl$ requires 64.2% of carbon, 4.7% of hydrogen, 14.0% of nitrogen and 11.7% of chlorine). $\lambda_R=50$.

EXAMPLE 11

*1-Phenyl-3-(2-Methyl-3-Chloroanilino)-5-Pyrazolone*

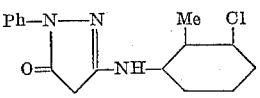

In place of the 12.1 parts of 2:4-dimethylaniline used in Example 9 there are used 14.1 parts of 2-methyl-3-chloraniline. The colour coupler is crystallised from methanol and is obtained as colourless crystals with melting point 174–175° C. On analysis the coupler is found to contain 64.0% of carbon, 4.3% of hydrogen and 11.7% of chlorine ($C_{16}H_{14}ON_3Cl$ requires 64.2% of carbon, 4.7% of hydrogen and 11.7% of chlorine). $\lambda_R=48$.

EXAMPLE 12

*1-Phenyl-3-(2-Methyl-5-Chloroanilino)-5-Pyrazolone*

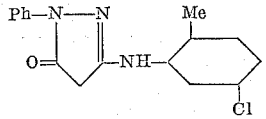

In place of the 12.1 parts of 2:4-dimethylaniline used in Example 9 there are used 14.1 parts of 2-methyl-5-chloroaniline. After crystallization from n-propanol the coupler is obtained as colourless crystals melting at 186° C. On analysis the coupler is found to contain 64.2% of carbon, 4.5% of hydrogen, 14.0% of nitrogen and 11.6% of chlorine ($C_{16}H_{14}ON_3Cl$ requires 64.2% of carbon, 4.7% of hydrogen, 14.0% of nitrogen and 11.7% of chlorine). $\lambda_R=47$.

EXAMPLE 13

*1-Phenyl-3-(2-Methoxy-4-Chloroanilino)-5-Pyrazolone*

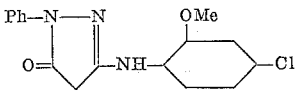

In place of the 12.1 parts of 2:4-dimethylaniline used in Example 9 there are used 15.7 parts of 2-methoxy-4-chloroaniline. The coupler is recrystallized from n-propanol and has melting point 188° C. On analysis the coupler is found to contain 61.0% of carbon, 3.4% of hydrogen, 12.7% of nitrogen and 10.7% of chlorine ($C_{16}H_{14}O_2N_3Cl$ requires 61% of carbon, 4.4% of hydrogen, 13.3% of nitrogen and 11.1% of chlorine). $\lambda_R = 52$.

EXAMPLE 14

*1-Phenyl-3-(2-Methyl-4-n-Butylanilino)-5-Pyrazolone*

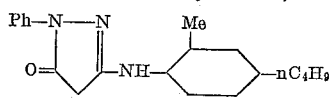

A mixture of 10.8 parts of 1-phenyl-3-amino-5-pyrazolone, 10 parts of 2-methyl-4-n-butylaniline and 20 parts of acetic acid is heated under reflux for 8 hours. After standing at room temperature for two days the coupler crystallises out and is filtered off and thrice recrystallised from methanol to give colourless crystals melting at 132–134° C. On analysis the coupler is found to contain 74.7% of carbon, 6.8% of hydrogen and 12.5% of nitrogen ($C_{20}H_{23}ON_3$ requires 74.75% of carbon, 7.15% of hydrogen and 13.1% of nitrogen). $\lambda_R = 56$.

EXAMPLE 15

*1-(Cyanophenyl)-3-(2-Methoxyanilino)-5-Pyrazolone*

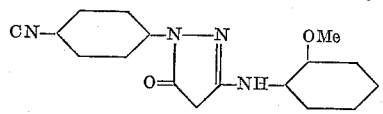

A mixture of 10 parts of 1-(4-cyanophenyl)-3-amino-5-pyrazolone, 6.2 parts of 2-methoxyaniline and 100 parts of acetic acid is heated under reflux for 4 hours. The reaction mixture is poured into water and the precipitated gum washed with water by decantation and then triturated with methanol when it solidifies. The coupler is recrystallised from β-ethoxy ethanol and then melts at 250–252° C. On analysis the coupler is found to contain 66.0% of carbon, 4.6% of hydrogen and 17.4% of nitrogen ($C_{17}H_{14}O_2N_4$ requires 66.6% of carbon, 4.6% of hydrogen and 18.3% of nitrogen). $\lambda_R = 52$.

EXAMPLE 16

*1-Phenyl-3-(2-Methoxy-5-Benzoylaminoanilino)-5-Pyrazolone*

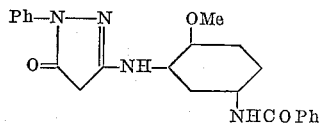

A mixture of 7.25 parts of 1-phenyl-3-amino-5-pyrazolone, 10 parts of 2-methoxy-5-benzoylaminoaniline and 20 parts of acetic acid is heated under reflux for 1¼ hours during which time the coupler crystallises out. The colour coupler is filtered off, washed with methanol, dissolved in n-propanol by adding dilute potassium hydroxide solution and precipitated by the addition of acetic acid. The coupler is filtered off, washed with methanol and dried to give an off-white solid melting at 244–246° C. with decomposition. On analysis the coupler is found to contain 67.0% of carbon, 4.8% of hydrogen and 13.2% of nitrogen ($C_{23}H_{20}O_3N_4$ requires 67.3% of carbon, 4.9% of hydrogen and 13.65% of nitrogen). $\lambda_R = 57$.

EXAMPLE 17

*1-Phenyl-3-(2-Methoxy-5-Bromoanilino)-5-Pyrazolone*

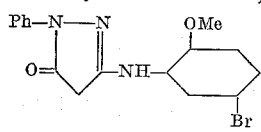

A mixture of 35 parts of 1-phenyl-3-amino-5-pyrazolone, 40.4 parts of 2-methoxy-5-bromoaniline and 100 parts of acetic acid is heated under reflux for 1½ hours during which time the coupler crystallises out. The reaction mixture is cooled and the product filtered off, washed with methanol and twice recrystallised from n-propanol to give colourless crystals melting at 198–200° C. On analysis the coupler is found to contain 53.9% of carbon, 3.6% of hydrogen, and 22.5% of bromine ($C_{16}H_{14}O_2N_3Br$ requires 53.5% of carbon, 3.6% of hydrogen and 22.25% of bromine). $\lambda_R = 54$.

EXAMPLE 18

*1-Phenyl-3-(2:4-Dichloroanilino)-5-Pyrazolone*

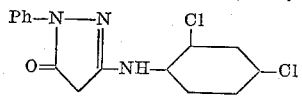

A mixture of 8.75 parts of 1-phenyl-3-amino-5-pyrazolone, 12.15 parts of 2:4-dichloroaniline and 30 parts of acetic acid is heated under reflux for 24 hours. The reaction mixture is cooled and kept at 20° C. for 2 days when the crystalline product is filtered off, washed with cold methanol and thrice recrystallised from n-propanol to give the coupler as colourless crystals, melting point 224–226° C. On analysis the coupler is found to contain 56.9% of carbon, 3.9% of hydrogen, 12.8% of nitrogen and 22.4% of chlorine ($C_{15}H_{11}ON_3Cl_2$ requires 56.2% of carbon, 3.45% of hydrogen, 13.1% of nitrogen and 22.2% of chlorine). $\lambda_R = 46$.

EXAMPLE 19

*1-Phenyl-3-(2-Chloro-4-Nitroanilino)-5-Pyrazolone*

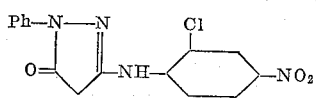

30 parts of 1-phenyl-3-(2-chloro-4-nitrophenoxyacetylamino)-5-pyrazolone are added to a solution of 6 parts of sodium hydroxide in 65 parts of water and 55 parts of ethanol. The mixture is stirred at 45° C. for a few minutes until solution is obtained, and then at 20° C. for 18 hours. The deep red solution is acidified with acetic acid and the precipitated coupler filtered off, washed with water and recrystallised from a mixture of dimethyl formamide and methanol. The colour coupler melts at 232° C. $\lambda_R = 48$.

The 1-phenyl-3-(2-chloro-4-nitrophenoxyacetylamino)-5-pyrazolone used in the above example may be prepared in the following manner:

A mixture of 17.5 parts of 1-phenyl-3-amino-5-pyrazolone 28.2 g. 2-chloro-4-nitrophenoxyacetyl chloride and 100 cc. acetonitrile is stirred and heated under reflux for 4 hours. After cooling the intermediate is filtered off, washed with acetonitrile and dried to give a fawn solid, melting point 258–260° C. The 2-chloro-4-nitrophenoxyacetyl chloride itself is obtained as follows:

96 parts of chloroacetic acid is added to a solution of 173 parts of 2-chloro-4-nitrophenol in 675 parts of water in which 80 parts of sodium hydroxide are dissolved. The deeply orange solution so obtained is stirred and heated under reflux for 11 hours. After cooling to 25° C. the mixture is acidified with 100 parts of concentrated hydrochloric acid and the precipitated product filtered off and washed with water. The crude 2-chloro-4-nitrophenoxyacetic acid dissolved in 150 parts of methanol is added to a solution of 33 parts of sodium hydroxide in 500 parts of methanol when the yellow sodium salt is precipitated. This is filtered off, washed with a little methanol and then dissolved in 500 parts of water and the solution acidified with hydrochloric acid to give 2-chloro-4-nitrophenoxy acetic acid, melting point 175–176° C. The acid is converted to the acid chloride by heating under reflux with twice its weight of thionyl chloride for 2 hours and then evaporating to dryness.

EXAMPLE 20

*1-(2:4:6-Trichlorophenyl)-3-(2-Chloro-4-Nitroanilino)- 5-Pyrazolone*

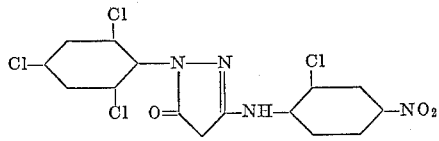

10 parts of 1-(2:4:6-trichlorophenyl)-3-(2-chloro-4-nitrophenoxyacetylamino)-5-pyrazolone are added to a solution of 2 parts of sodium hydroxide in 5 parts of water and 20 parts of ethanol and the solution obtained stirred at 20° C. for 18 hours. The solution is then diluted with water and acidified with acetic acid. The precipitated coupler is filtered off, washed with water and crystallised first from ethanol and then twice from acetonitrile to give brown crystals, melting point 206° C. On analysis the coupler is found to contain 40.9% of carbon, 1.9% of hydrogen, 12.9% of nitrogen and 31.9% of chlorine ($C_{15}H_8O_3N_4Cl_4$ requires 41.5% of carbon, 1.9% of hydrogen, 12.9% of nitrogen and 32.7% of chlorine). $\lambda_R=36$.

The 1-(2:4:6-trichlorophenyl)-3-(2-chloro-4-nitrophenoxyacetylamino)-5-pyrazolone used in the above example may be obtained in the following manner:

A mixture of 13.9 parts of 1-(2:4:6-trichlorophenyl)-3-amino-5-pyrazolone, 13 parts of 2-chloro-4-nitrophenoxyacetyl chloride and 30 parts of acetonitrile is stirred and heated under reflux for 4 hours. The reaction mixture is then cooled and the precipitated intermediate filtered off and dried to give a fawn solid, melting point 194–196° C.

The colour coupler is incorporated in a colour developer solution containing 3-methyl-4-N-ethyl-N-β-methylsulphonylaminoethylamino aniline. When an exposed emulsion layer is developed in this solution, then bleached and fixed, a magenta dye image is obtained. The absorption characteristics of the magenta dye image are given in FIGURE 3 of the accompanying drawings which also records the absorption characteristics of the dye image which may be similarly obtained from the corresponding coupler without the ortho chloro substituent and which is described in British patent specification No. 886,723. It is seen from FIGURE 3 that the dye image obtained from the coupler of this example is superior to that obtained from the coupler of British patent specification No. 886,723, especially in respect of the steeper flank to longer wavelengths.

EXAMPLE 21

*1-(2:4:6-Trichlorophenyl)-3-(2-Chloro-4-Acetylaminoanilino)-5-Pyrazolone*

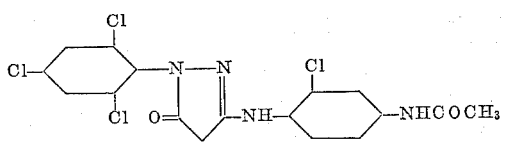

15 parts of 1-(2:4:6-trichlorophenyl)-3-(2-chloro-4-aminoanilino)-5-pyrazolone are dissolved in 45 parts of acetic anhydride and the solution heated at 95–100° C. for 2 hours. The solution is then cooled, the colour coupler then crystallising out, and after dilution with methanol the coupler is filtered off, washed with methanol and recrystallised from methanol. The coupler is obtained as colourless crystals, melting point 180° C., and on analysis is found to contain 45.1% of carbon, 2.5% of hydrogen, 12.3% of nitrogen and 32.1% of chlorine ($C_{17}H_{12}O_2N_4Cl_4$ requires 45.8% of carbon, 2.7% of hydrogen, 12.6% of nitrogen and 31.8% of chlorine). $\lambda_R=40$.

The 1-(2:4:6-trichlorophenyl)-3-(2-chloro-4-aminoanilino)-5-pyrazolone used in the above example may be obtained in the following manner:

A mixture of 31 parts of 1-(2:4:6-trichlorophenyl)-3-(2-chloro-4-nitroanilino)-5-pyrazolone, which is the coupler of Example 20, 200 parts of ethanol, 40 parts of hydrazine hydrate and 4 parts of Raney nickel is stirred and heated under reflux until it becomes pale yellow in colour. The reaction mixture is filtered whilst still hot to remove the nickel and the filtrate neutralised with acetic acid to give the amine as fawn coloured crystals, melting point 166–168° C.

EXAMPLE 22

*1-(2:4:6-Trichlorophenyl)-3-(2-Chloro-4-Benzoylaminoanilino)-5-Pyrazolone*

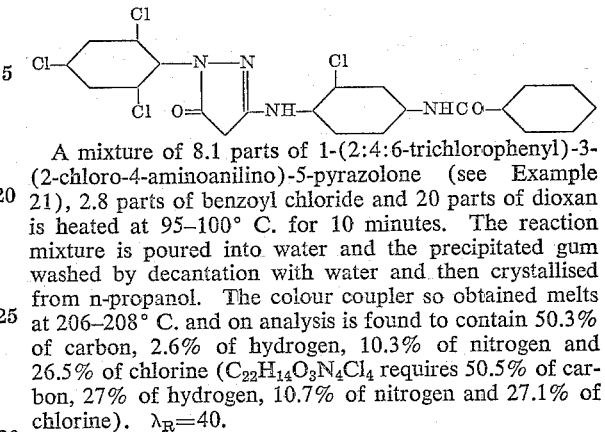

A mixture of 8.1 parts of 1-(2:4:6-trichlorophenyl)-3-(2-chloro-4-aminoanilino)-5-pyrazolone (see Example 21), 2.8 parts of benzoyl chloride and 20 parts of dioxan is heated at 95–100° C. for 10 minutes. The reaction mixture is poured into water and the precipitated gum washed by decantation with water and then crystallised from n-propanol. The colour coupler so obtained melts at 206–208° C. and on analysis is found to contain 50.3% of carbon, 2.6% of hydrogen, 10.3% of nitrogen and 26.5% of chlorine ($C_{22}H_{14}O_3N_4Cl_4$ requires 50.5% of carbon, 27% of hydrogen, 10.7% of nitrogen and 27.1% of chlorine). $\lambda_R=40$.

EXAMPLE 23

*1-(2:4:6-Trichlorophenyl)-3-(2-Chloro-4-Coumarilylaminoanilino)-5-Pyrazolone*

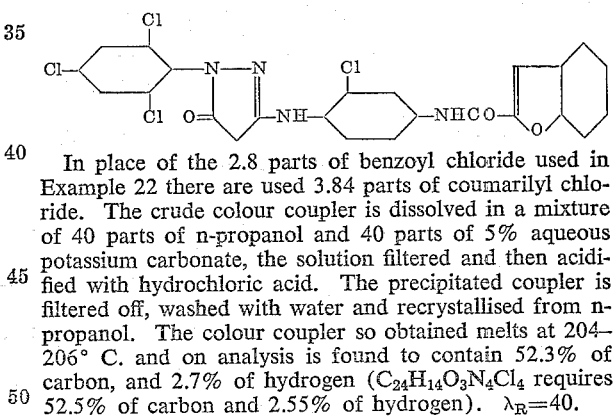

In place of the 2.8 parts of benzoyl chloride used in Example 22 there are used 3.84 parts of coumarilyl chloride. The crude colour coupler is dissolved in a mixture of 40 parts of n-propanol and 40 parts of 5% aqueous potassium carbonate, the solution filtered and then acidified with hydrochloric acid. The precipitated coupler is filtered off, washed with water and recrystallised from n-propanol. The colour coupler so obtained melts at 204–206° C. and on analysis is found to contain 52.3% of carbon, and 2.7% of hydrogen ($C_{24}H_{14}O_3N_4Cl_4$ requires 52.5% of carbon and 2.55% of hydrogen). $\lambda_R=40$.

EXAMPLE 24

*1-(2:4:6-Trichlorophenyl)-3-(2-Acetylaminoanilino)- 5-Pyrazolone*

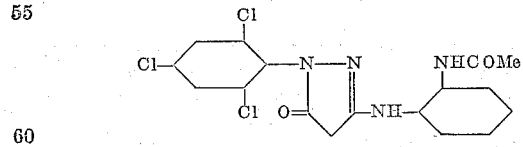

10 parts of 1-(2:4:6-trichlorophenyl)-3-(2-aminoanilino)-5-pyrazolone is heated with 20 parts of acetic anhydride at 60° C. for 10 minutes, and then kept at 20° C. for 1 hour. The reaction mixture is poured into water and the precipitated gum washed by decantation with water. The gum is then dissolved in methanol and the solution poured into water to precipitate the coupler as a fawn solid, M. Pt. 162–164° C. On analysis the coupler is found to contain 13.1% of nitrogen and 25.5% of chlorine ($C_{17}H_{13}O_2N_4Cl_3$ requires 13.6% of nitrogen and 25.6% of chlorine). $\lambda_R=48$.

The 1-(2:4:6-trichlorophenyl)-3-(2-aminoanilino)-5-pyrazolone used in the above example may be obtained in the following manner:

A mixture of 10 parts of 1-(2:4:6-trichlorophenyl)-3-

(2-nitroanilino)-5-pyrazolone, 100 parts of ethanol, 10 parts of hydrazine hydrate and 1 part of Raney nickel is stirred and heated under reflux until it becomes straw coloured. The nickel is then filtered off and the filtrate poured into 200 parts of water and acidified with acetic acid. The precipitated amine is filtered off, washed with water and dried, melting point 141–145° C. (indistinct).

EXAMPLE 25

*1-(4-Bromophenyl)-3-(2-Chloroanilino)-5-Pyrazolone*

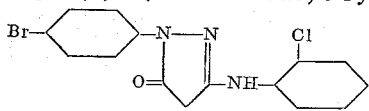

A mixture of 12.7 parts of 1-(4-bromophenyl)-3-amino-5-pyrazolone, 6.4 parts of 2-chloroaniline and 50 parts of acetic acid is heated under reflux for 8 hours. The reaction mixture is cooled and the crystalline coupler filtered off, washed with methanol and recrystallised from acetic acid to give fawn crystals, melting point 194° C. $\lambda_R=52$.

EXAMPLE 26

*1 - Phenyl - 3 - [2{β[N - (4 -n - Dodecylphenyl)acetylamino] - β - Carboxypropionylamino}anilino] - 5-Pyrazolone*

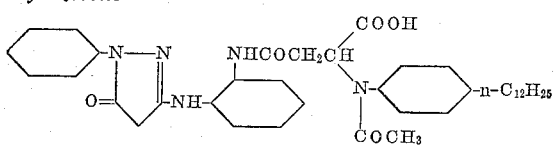

A mixture of 3.78 parts of 1-phenyl-3-(2-aminoanilino)-5-pyrazolone, 5.7 parts of N-(4-n-dodecylphenyl)-acetylaminosuccinic anhydride and 40 parts of ethyl acetate is heated under reflux for 2 hours. The reaction mixture is then kept at 20° C. for 18 hours when the crystalline coupler is filtered off and washed with diethyl ether. On analysis the coupler is found to contain 69.3% of carbon, 7.3% of hydrogen, and 10.3% of nitrogen ($C_{39}H_{49}O_5N_5$ requires 70.2% of carbon, 7.3% of hydrogen and 10.5% of nitrogen). $\lambda_R=55$.

A mixture of 3.7 parts of 1-(2:4:6-trichlorophenyl)-3-(2-aminoanilino)-5-pyrazolone (see Example 24), 4.01 parts of N(4-n-dodecylphenyl)acetylaminosuccinic anhydride and 25 parts of ethyl acetate is stirred and heated under reflux for 4 hours and then evaporated to dryness under reduced pressure. The residual gum is crystallised first from methanol and then from n-propanol to give the colour coupler, melting point 146–148° C. On analysis the colour coupler is found to contain 8.8% of nitrogen and 13.7% of chlorine ($C_{39}H_{46}O_5N_5Cl_3$ requires 9.1% of nitrogen and 13.8% of chlorine). $\lambda_R=46$.

A photographic emulsion layer containing the colour coupler may be obtained in the following manner.

1.29 parts of the colour coupler are dissolved in 15 parts of n-propanol, 1.5 parts of 2 N potassium hydroxide and 15 parts of water and the solution added to 500 parts of a green sensitized silver halide emulsion containing 20 parts of gelatin. The emulsion is then coated on a film base and the coated layer dried. After exposure to green light the emulsion layer is developed in a developer solution containing 4 - amino-N-ethyl-N-ω-hydroxypentylaniline, bleached and fixed to give a magenta dye image. The absorption characterishtics of the dye are given in FIGURE 1 of the accompanying drawings. FIGURE 1 also records the absorption characteristics of the dye image which may be similarly obtained from the analogous coupler in which the substituent in the anilino group is in the para position. This coupler and its intermediates may be prepared by a similar route to that used for the ortho compounds. From FIGURE 1 it is clear that the ortho-substituted coupler gives the dye with the steeper flank to longer wavelengths.

EXAMPLE 28

*1 - (2:4:6 - Trichlorophenyl) - 3 - [2 - chloro - 4 - {β-[N - (4 - n - dodecylphenyl)acetylamino] - β - carboxypropionylamino}anilino]-5-pyrazolone*

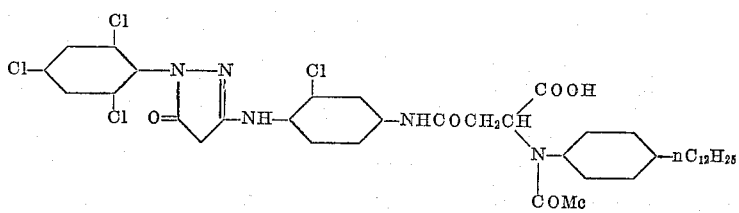

The 1-phenyl-3-(2-aminoanilino)-5-pyrazolone used in the above example may be obtained in the following manner:

A mixture of 7 parts of 1-phenyl-3-(2-nitroanilino)-5-pyrazolone, 100 parts of ethanol, 25 parts of hydrazine hydrate and 1 part of Raney nickel is stirred and heated under reflux until the mixture is straw-coloured. The nickel is then filtered off and the filtrate poured into dilute hydrochloric acid and the mixture saturated with sodium chloride. The precipitated amine is filtered off, washed with water and dried, melting point 144–146° C.

EXAMPLE 27

*1 - (2:4:6 - Trichlorophenyl) - 3 - [2{β - [N - (4 - n-dodecylphenyl)acetylamino]-β-carboxypropionylamino} anilino]-5-pyrazolone*

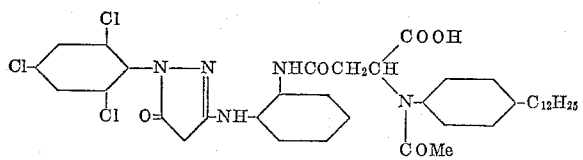

A mixture of 4.04 parts of 1-(2:4:6-trichlorophenyl)-3-(2-chloro-4-aminoanilino)-5-pyrazolone (see Example 21), 4.01 parts of N(4-n-dodecylphenyl)acetylaminosuccinic anhydride and 35 parts of ethyl acetate is heated under reflux for 3 hours. The reaction mixture is filtered and the filtrate evaporated under reduced pressure to give the coupler as an amorphous solid, M. Pt. 148–153° C. $\lambda_R=40$.

An emulsion layer containing the colour coupler and derived magenta dye image may be obtained as described in Example 27. The absorption characteristics are given in FIGURE 2 of the accompanying drawings which also records the absorption characteristics of the dye image which may be similarly obtained from the corresponding coupler which does not contain an ortho chloro substituent in the anilino ring. These absorption characteristics show that the introduction of an ortho chloro substituent results in an improvement in the absorption characteristics, particularly in that the flank to longer wavelengths is steepened.

EXAMPLE 29

*1 - Phenyl - 3 - [2 - chloro - 4 - {β - N - (4 - n - dodecylphenyl)acetylamino - β - carboxy-propionylamino}anilino]-5-pyrazolone*

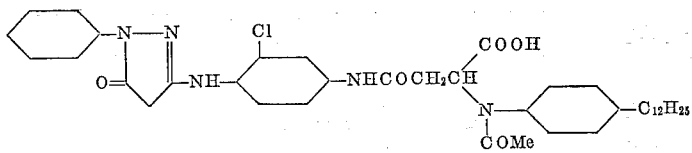

In place of the 4.04 parts of 1-(2:4:6-trichlorophenyl-3-(2-chloro-4-aminoanilino)-5-pyrazolone used in Example 28 there are used 3 parts of 1-phenyl-3-(2-chloro-4-aminoanilino)-5-pyrazolone. The colour coupler so obtained melts at 136–139° C. $\lambda_R=50$.

The 1-phenyl-3-(2-chloro-4-aminoanilino)-5-pyrazolone used in the above example may be obtained in the following manner:

A mixture of 10 parts of 1-phenyl-3(2-chloro-4-nitroanilino)-5-pyrazolone, which is the coupler of Example 19, 100 parts of ethanol, 10 parts of hydrazine hydrate and 1 part of Raney nickel is stirred and heated under reflux until the mixture is straw-coloured. The reaction mixture is then diluted with an equal volume of water, cooled, filtered and the filtrate acidified with acetic acid. The precipitated amine is filtered off, washed with water and dried, melting point 155–157° C.

EXAMPLE 30

*1 - (2:4:6 - Trichlorophenyl) - 3 - [2 - chloro - 4 - {β-(N - n - octadecylisobutyrylamino)β - carboxypropionylamino}anilino]-5-pyrazolone*

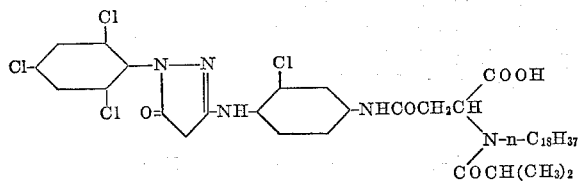

A mixture of 8.08 g. of 1-(2:4:6-trichlorophenyl)-3-(2-chloro-4-amino)-5-pyrazolone (see Example 21), 8.74 parts of N-n-octadecylisobutyryl aminosuccinic anhydride and 40 parts of ethyl acetate is stirred and heated under reflux for 3 hours. The reaction mixture is then evaporated to dryness and the residual gum crystallised from methanol to give the coupler as fawn crystals, melting point 142–144° C. On analysis the coupler is found to contain 8.5% of nitrogen and 17.0% of chlorine.

$(C_{41}H_{57}O_5N_5Cl_4)$ requires 8.3% of nitrogen and 16.9% of chlorine). $\lambda_R=43$.

EXAMPLE 31

*1-(4-Nitrophenyl)-3-(2-methoxyanilino)-5-pyrazolone*

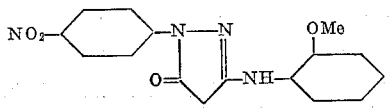

A mixture of 44 parts of 1-(4-nitrophenyl)-3-amino-5-pyrazolone, 25 parts of 2-methoxy aniline and 200 parts of acetic acid is stirred and heated under reflux for 18 hours. The reaction mixture is then cooled and the colour coupler filtered off, washed with methanol and dried. The coupler is obtained as brown micro crystals melting at 246–247° C. and on analysis is found to contain 58.7% of carbon, 4.8% of hydrogen and 16.8% of nitrogen ($C_{16}H_{14}O_4N_4$ requires 58.9% of carbon, 4.3% of hydrogen and 17.15% of nitrogen). $\lambda_R=54$.

EXAMPLE 32

*1-Phenyl - 3 - [2-Methoxy - 5 - {β-[N-(4 - n - Dodecylphenyl)Acetylamino] - β - Carboxypropionylamino}-Anilino]-5-Pyrazolone*

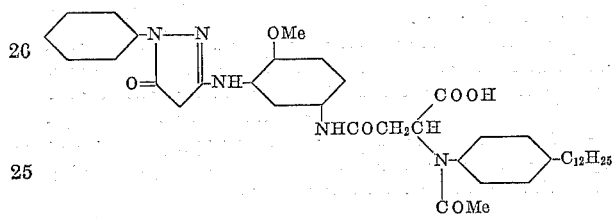

A mixture of 14 parts of 1-phenyl-3-(2-methoxy-5-aminoanilino)-5-pyrazolone, 19 parts of N(4-n-dodecylphenyl)acetylaminosuccinic anhydride and 75 parts of ethyl acetate is stirred and heated under reflux for 1½ hours during which time the colour coupler crystallises out. After cooling, the coupler is filtered off, washed with ethyl acetate and recrystallised from n-propanol, to give colourless crystals melting at 198–200° C. On analysis the coupler is found to contain 68.9% of carbon, 7.5% of hydrogen and 10.1% of nitrogen ($C_{40}H_{51}O_6N_5$ requires 68.8% of carbon, 7.35% of hydrogen and 10.05% of nitrogen). $\lambda_R=57$.

The 1-phenyl-3-(2-methoxy - 5 - aminoanilino)-5-pyrazolone used in the above example may be obtained in the following manner:

A mixture of 30 parts of 1-phenyl-3-(2-methoxy-5-nitroanilino)-5-pyrazolone, which is the colour coupler of Example 6, 650 parts of n-propanol, 120 parts of hydrazine hydrate and 5 parts of Raney nickel is stirred and heated under reflux for 1 hour. The nickel is then filtered off and the filtrate cooled in an atmosphere of nitrogen to give the amine as fawn crystals with melting point 204–205° C. On analysis the amine is found to contain 65.2% of carbon, 5.3% of hydrogen and 18.7% of nitrogen ($C_{16}H_{16}O_2N_4$ requires 64.9% of carbon, 5.4% of hydrogen and 18.9% of nitrogen).

EXAMPLE 33

*1-Phenyl - 3 - [2-Methyl - 5 - [β-[N-(4 - n - Dodecylphenyl)Acetylamino]β - Carboxypropionylamino]Anilino]-5-Pyrazolone*

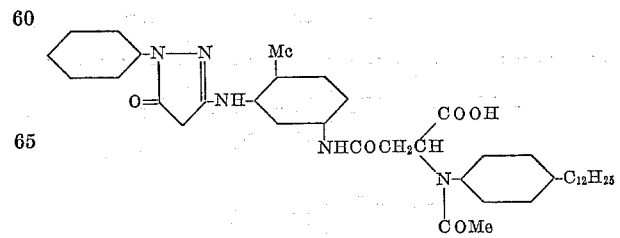

A mixture of 20 parts of 1-phenyl-3-(2-methyl-5-aminoanilino)-5-pyrazolone, 28.65 parts of N(4-n-dodecylphenyl)acetylaminosuccinic anhydride and 150 parts of ethyl acetate is stirred and heated under reflux for 1 hour during which time the colour coupler crystallises out. After cooling the coupler is filtered off, washed with ethyl acetate and recrystallised from aqueous n-propanol. The colour coupler melts at 183–184° C. and on analysis is found to contain 68.7% of carbon, 7.7% of hydrogen and 9.9% of nitrogen ($C_{40}H_{51}O_5N_5 \cdot 1H_2O$ requires 68.65% of carbon, 7.6% of hydrogen and 10.0% of nitrogen). $\lambda_R = 52$.

The 1-phenyl-3-(2-methyl-5-aminoanilino)-5-pyrazolone used in the above example may be obtained in the following manner:

30 parts of 1-phenyl-3-(2-methyl-5-acetylaminoanilino)-5-pyrazolone, which is the coupler of Example 5, is heated under reflux with 300 parts of 2N potassium hydroxide solution in an atmosphere of nitrogen for 1½ hours. The solution obtained is cooled and acidified with acetic acid to precipitate the intermediate which is filtered off, washed with water and dried over calcium chloride under reduced pressure, melting point 155–156° C.

What we claim is:

1. A process for the production of a magenta colour image as a step in a process of colour photography which comprises developing a reducible silver salt image in a photographic emulsion layer by means of a developer selected from the class consisting of N,N-di-substituted p-phenylene diamine derivatives in the presence of a colour coupler of the general formula

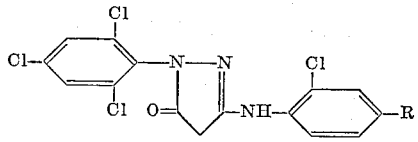

wherein R is a group selected from the class consisting of

—NO₂, —NHCOCH₃, —NHCOC₆H₅

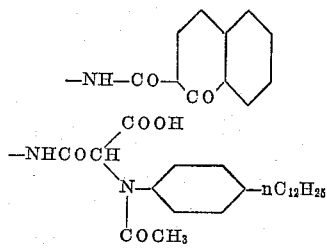

and

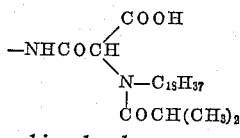

2. A photographic developer comprising a photographic developing agent, an alkali substance and a colour coupler of the general formula

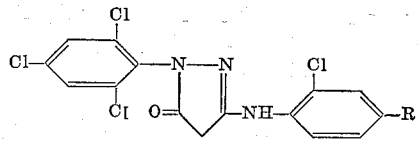

wherein R is a group selected from the class consisting of

—NO₂, —NHCOCH₃, —NHCOC₆H₅

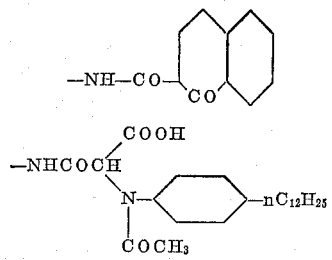

and

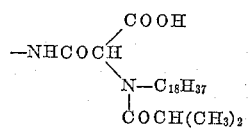

3. A photographic silver halide emulsion containing, dispersed therein, a colour coupler of the general formula

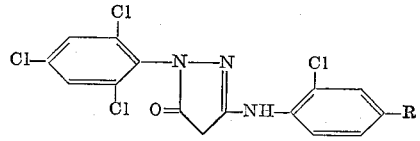

wherein R is a group selected from the class consisting of

—NO₂, —NHCOCH₃, —NHCOC₆H₅

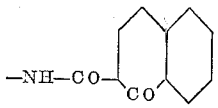

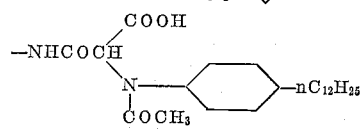

and

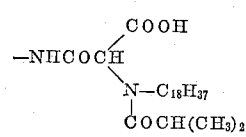

4. A process for the production of magenta colour image as a step in a process of colour photography which comprises developing a reducible silver salt image in a photographic emulsion layer by means of a developer selected from the class consisting of N,N-di-substituted p-phenylene diamine derivatives in the presence of a colour coupler of the formula

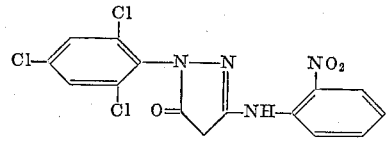

5. A photographic developer comprising a photographic developing agent, an alkali substance and a colour coupler of the formula

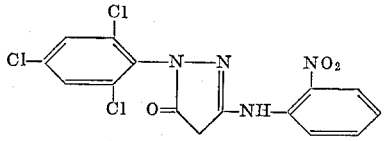

6. A photographic silver halide emulsion containing, dispersed therein, a colour coupler of the formula

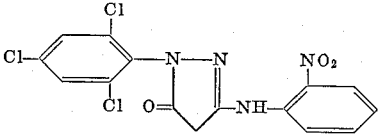

References Cited in the file of this patent
UNITED STATES PATENTS

| | | |
|---|---|---|
| 2,311,082 | Porter et al. | Feb. 16, 1943 |
| 2,829,975 | Popeck et al. | Apr. 8, 1958 |
| 2,897,206 | Fukui et al. | July 28, 1959 |
| 2,899,443 | Schulze | Aug. 11, 1959 |
| 2,902,366 | Sprung et al. | Sept. 1, 1959 |
| 2,927,928 | Schulze | Mar. 8, 1960 |
| 2,983,608 | Beavers | May 9, 1961 |
| 3,004,984 | Stach et al. | Oct. 17, 1961 |